United States Patent [19]

Carroll et al.

[11] Patent Number: 4,686,592
[45] Date of Patent: Aug. 11, 1987

[54] DISK DRIVE ASSEMBLY

[76] Inventors: Thomas D. Carroll; Clifford B. Akers, both of 1475 S. Bascom Ave., Suite 201, Campbell, Calif. 95008

[21] Appl. No.: 730,664

[22] Filed: May 2, 1985

[51] Int. Cl.$^4$ .......................... G11B 5/012; G11B 5/82
[52] U.S. Cl. ........................................ 360/97; 360/135
[58] Field of Search ..................................... 360/97-99, 360/135

[56] References Cited

U.S. PATENT DOCUMENTS

| | | | |
|---|---|---|---|
| 3,359,549 | 12/1967 | Farrand et al. | 360/97 |
| 3,480,964 | 11/1969 | Siler | 360/135 |
| 3,537,083 | 10/1970 | Voth | 360/135 X |
| 3,599,226 | 8/1971 | Lips | 360/135 |
| 4,317,150 | 2/1982 | Gruss et al. | 360/99 X |
| 4,337,491 | 6/1982 | Hasler et al. | 360/97 |

FOREIGN PATENT DOCUMENTS 1005103  9/1965  United Kingdom ................ 360/135

OTHER PUBLICATIONS

IBM/TDB, vol. 17, No. 1, Jun. 1974, p. 322, "Large Bulk Storage Memory" by Orlando.

*Primary Examiner*—John H. Wolff
*Attorney, Agent, or Firm*—Limbach, Limbach & Sutton

[57] ABSTRACT

An improved disk drive device including a disk of recording media and having a central aperture, which disk is supported at its periphery by a cylindrical housing. A spindle motor is positioned at the outer periphery of the housing along with a single set of bearings, also positioned at the other periphery of the housing, to cause rotation of the housing relative to a base. A stepper motor is positioned with its shaft protruding through the center aperture of the disk and directly coupled to read/write heads. The stepper motor shaft is positioned parallel to but offset from the center line of the disk so that rotation of the stepper motor shaft causes the read/write heads to translate along an arc across the surface of the disk. The arc extends from the inner track of the disk to the outer track thereof.

25 Claims, 9 Drawing Figures

DISK DRIVE ASSEMBLY

DESCRIPTION

1. Technical Field

The present invention is directed, in general, to data storage devices, and more particularly to a disk drive recording device.

2. Background Art

The typical disk drive device comprises a disk of recording media which is placed into motion by a rotational force applied to its center. Read/write heads are placed in close association with the disk's surfaces and translated across the disk's surfaces by rotary or linear actuated means. Electronic circuitry is provided to control the rotation of the disk, the positioning of the read/write heads, and to act as an interface between the user and the read/write heads. Unfortunately, the typical disk drive, especially in the disk drives used in conjunction with microcomputers, including personal computers, exhibits several drawbacks. Among these drawbacks are: large physical size and weight, high cost, complexity of manufacture, and sensitivity to temperature effects.

An alternate disk drive structure has been suggested in the prior art, more specifically in U.S. Pat. No. 3,359,549 to Farrand, et al., U.S. Pat. No. 4,317,150 to Gruss, et al., and IBM Disclosure Bulletin, Vol. 17, No. 1, June, 1974, page 322. These materials disclose, generally, a disk drive assembly including a disk of recording material having a center aperture and supported along the outer periphery by a rotating cyclindrical-shaped housing. Actuator means are positioned in the center aperture of the disk and include read/write heads which are translated across the surface of the recording material. Unfortunately, these materials disclose structures which are also large in physical size, complex, and expensive to manufacture.

Contributing to the large physical size is the use in these structures of a drive mechanism which applies rotational force to the housing in the vicinity of the center aperture of the disks. With such structures, at least two, physically-spaced bearings are required to support the housing with respect to the base.

Further, materials which illustrate the state of the art include U.S. Pat. No. 3,480,964 to Siler, U.S. Pat. No. 3,537,083 to Voth, U.S. Pat. No. 3,599,226 to Lips et al., and British Patent Specificiation No. 1,005,103 to Skolande.

DESCRIPTION OF INVENTION

These and other problems of previous disk drive devices are overcome by the present invention of an improved disk drive device of the type including a disk having at least one recording surface and an aperture centered with respect to the center line of the disk, transducer means for sensing the recording surface, a housing, and a base, wherein the disk is secured about its periphery to the periphery of the housing; the improvement comprising bearing means positioned on the base for supporting the housing at the housing periphery for rotation; means for urging the housing to rotate relative to the base; and means coupled to the transducer means through the aperture and supported on the base for moving the transducer means relative to the surface of the disk.

The means for urging the housing for rotation include motor means which apply force to the housing at the periphery thereof. The transducer moving means are preferably a stepper motor having a shaft which extends through the aperture and connects to the transducer means by way of a bracket. Preferably the center line of the stepper motor shaft is offset from the center line of the disk by a pre-determined amount. Further, it is preferred that the bracket has dimensions such that the transducer means are displaced a predetermined distance along a first orthogonal axis, having its origin at the center line of the stepper motor shaft, and displaced a further distance along a second axis orthogonal to the first axis, also having its origin at the center line of the shaft. In this manner, the skewing of the transducer means as the transducer means are translated across the surface of the disk, relative to the orientation of the information on the disk, is minimized.

In one embodiment, the bearing means are self actuating gas bearings. In another embodiment, the bearing means are positioned in a single plane. The positioning of the bearings in a single plane, or the use of gas bearings, and positioning the bearing means at the periphery of the housing of the device, along with the positioning of the means for urging the housing into rotation at the periphery of the housing, permits a more compact size for the disk drive device, as well as decreases the complexity of the device. The direct coupling of the transducer means to the stepper motor also permits a reduction in complexity and physical size.

It is therefore an object of the present invention to provide an improved disk drive apparatus having a disk with a center aperture, wherein the disk is caused to rotate by the application of rotational force to its outer periphery, and where bearing and motor means are provided at the outer periphery thereof to permit such rotation.

It is another object of the present invention to provide an improved disk drive device in which a disk having a recording surface and a center aperture is accessed by transducer means which are actuated by rotational means positioned in the center aperture, but offset from the center line of the disk.

It is a further object of the present invention to provide a disk drive device in which transducer means access data from a recording surface of a disk wherein the transducer means are directly coupled to actuator means.

It is a still further object of the present invention to provide a disk drive having a housing, a disk positioned in the housing, and gas bearings positioned at the periphery of the housing to permit rotation of the housing and the disk relative to a transducer.

These and other objectives, features, and advantages of the present invention will be more readily understood upon consideration of the following detailed description and figures.

BEST MODE FOR CARRYING OUT THE INVENTION

Figure 1:
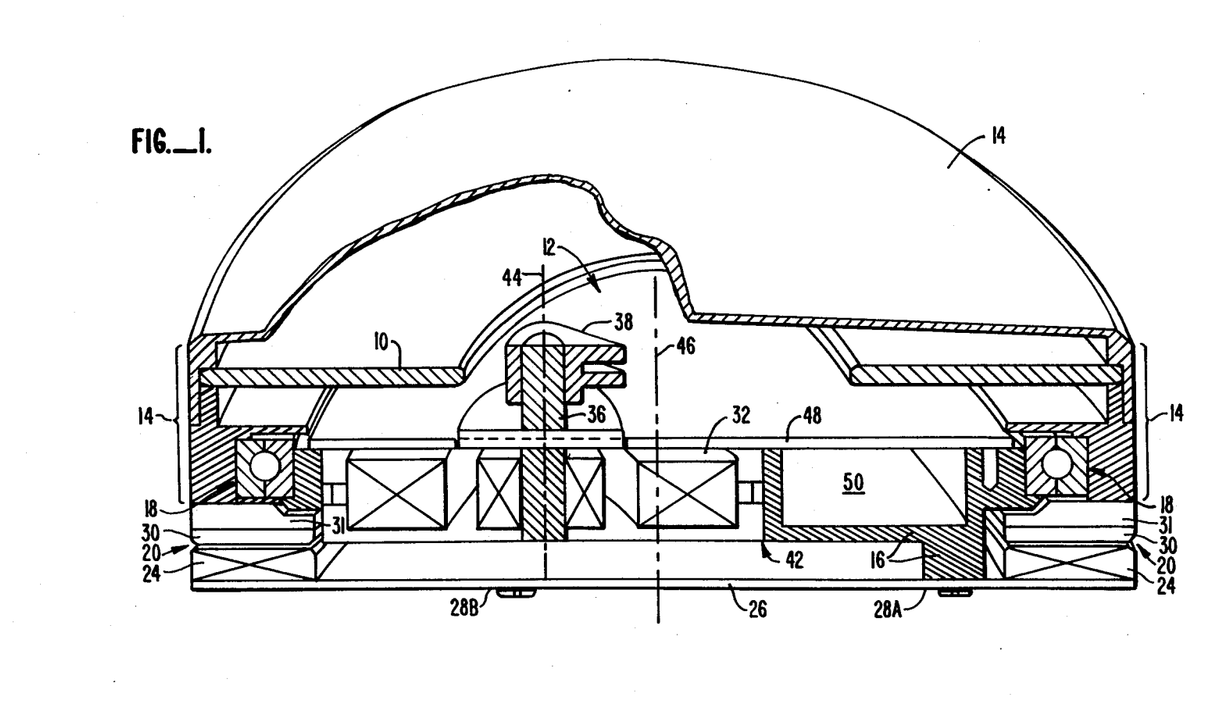
FIG. 1 is a simplified perspective/cutaway view of the present invention.

Referring to FIG. 1, a magnetic recording device is shown which encompasses only that space radially occupied by the diameter of a rigid disk plus a safety housing. The weight of the device is governed in large part only by the various components which rotate the disk and the recording head access mechanism. Also included are sufficient electrical circuitry to provide read/write, servo control (when applicable) and a digital interface which would be similar to the industry standards now in effect and governing similar devices.

The compactness is enhanced by a design which allows a standard magnetic recording disk to be sufficiently clamped by the disk housing on the outer periphery of the recording disk to disallow any relative motion between the housing and disk. The housing rotates on bearings about and concentric to a center vertical axis. Preferably, the housing rotates at a speed of approximately 3600 RPM, driven by a brushless D.C. motor which has a stationary stator and the rotor is attached to and an integral part of the disk housing. This assembly is mounted to a stationary base plate through the outer bearing races.

The base plate also provides mounting support for a compact stepper motor. The stepper motor shaft extends through the base plate into the center interior space created by the disk and housing, and is free to rotate as dictated by the stepper motor rotor/stator/electronics. The stepper motor shaft is offset from the center axis about which the housing/disk rotate. The magnetic recording heads which fly above the rotating disk surface on an air bearing are mounted to the head suspension apparatus which in turn is mounted to and supported by a head/arm mounting structure. This structure is mounted firmly to the shaft of the stepper motor. This arrangement allows the heads to access in an arc which can be described as a spiral path which transverses the magnetic recording band due to the offset between the stepper motor shaft and the theoretical centerline (axis) about which the housing/disk rotate.

A stationary ramp existing on the same plane as the disk allows the heads to be unloaded/loaded in relation to the disk. When unloaded, the heads are physically removed from the recording disk surface. The position is achieved by continuing to rotate the heads inward beyond the inner track approximately 45 degrees.

The electronic components for the brushless D.C. motor and stepper motor are mounted to a single printed circuit board. The disk drive functional electronic components reside on the same printed circuit board with provision for plugging external connectors.

Referring more specifically to FIG. 1, the present invention includes disk 10 having a center aperture 12 which is secured at its periphery to a housing 14. A base 16 is provided which supports bearings 18 which, in turn, permit housing 14 to rotate with respect to base 16. The rotational force for rotating housing 14 is supplied by a motor, such as a brushless DC motor 20 shown in FIG. 1. Brushless DC motor 20 includes a stationary stator which is supported by circuit board 26 and attached to base 16 at points 28A, B, and C. See FIG. 3B. A rotor 30 is secured to a facing plate 31 which, in turn, is secured to housing 14. Circuit board 26 supports motor drive and speed sensing circuitry associated with the control of motor 20.

The magnetic repulsion developed between stationary stator 24 and rotor 30 causes housing 14, and hence disk 10, to rotate along bearings 18 with respect to base 16. Further, the magnetic attraction provided between rotor 30 and stator 24 provide a preloading effect on bearings 18, when bearings 18 are implemented in the form of ball bearings, so as to reduce greatly the amount of axial and radial play in the rotation of housing 14.

It is to be noted that the stationary stator 24 and rotor 30 are positioned in the vicinity of the outer periphery of housing 14 and base 16. This positioning permits the use of a single, planar set of bearings, e.g. a single row ball bearing assembly, as shown in FIG. 1, to support the rotational motion of housing 14. In the disk drives of the past, the source of motor force was located towards the interior of the disk drive unit. As such, at least two sets of bearings in different planes were required to supply sufficient support to maintain disk 10 in a single rotational plane. For example, in the patent to Gruss, two sets of bearings are shown positioned apart from one another and adjacent to the central shaft of the device. In contrast, see FIG. 1 wherein bearings 18 are located adjacent the outside wall of housing 14 and in a single plane. As a result, not only are the number of required support bearings reduced, but also the height of the disk drive is also significantly shortened.

It is to be noted that rotor 30 can be a permanent magnet or the like.

A stepper motor 32 is provided for actuating transducers 34, such as read/write heads, into a predetermined range of positions above but in close proximity to the surface of disk 10. Stepper motor 32 has a shaft 36. Shaft 36 is attached to bracket 38. Heads 34 are directly coupled to bracket 38 by way of arms 40, FIG. 3B. Stepper motor 32 is supported by base 16 in compartment 42 thereof. As can be seen from FIG. 1, stepper motor 32 is positioned on the inside, or inwardly, of bearings 18.

Stepper motor 32 is positioned so that the center line 44 of shaft 36 is parallel to but offset from center line 46 of disk 10. Supported on the upper surface of base 16 is circuit board 48. It is to be noted that base 16 includes a recessed portion 50 which resides under portions of circuit board 48. Recessed portion 50 permits sufficient space between base 16 and circuit board 48 to accommodate any circuitry which might be desired to be placed upon circuit board 48. Typically this circuitry can be preamplifier circuits for use in conjunction with read/write heads 34.

In the preferred embodiment of the present invention the top and bottom surfaces of disk 10 are provided with a recording medium. Thus, preferably a top and bottom head 34 are provided.

Figure 2:
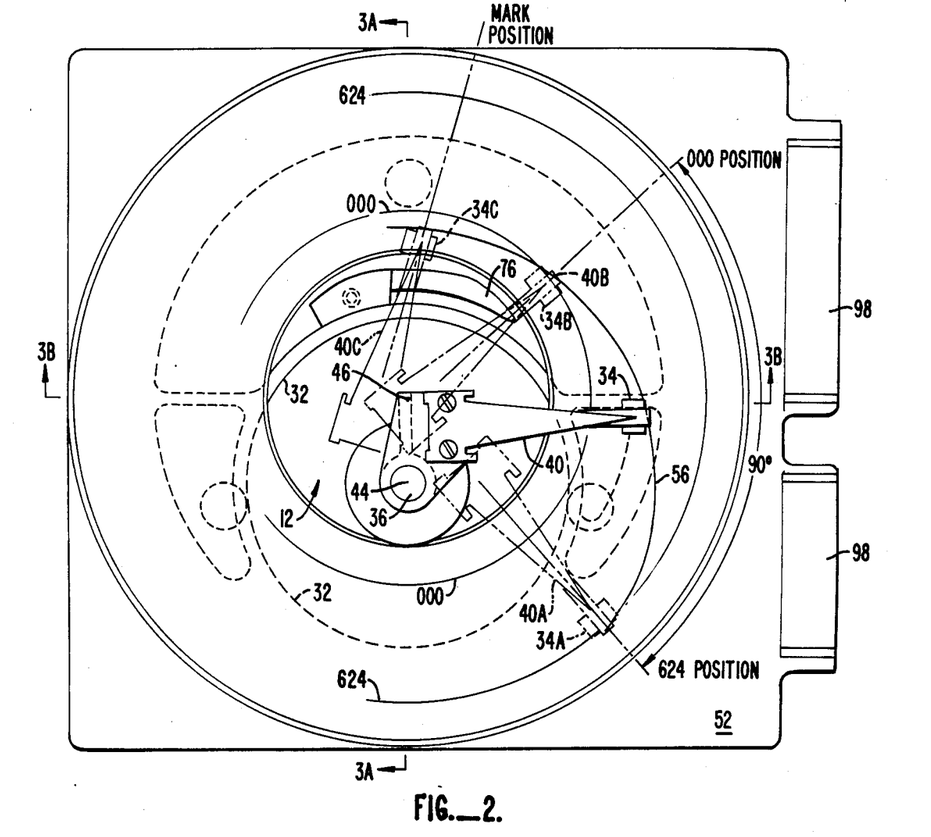
FIG. 2 is a plan view of the housing, disk and transducer of the present invention supported on a mother board.

Referring to FIG. 2, a plan view of the disk drive of the present invention is shown with the upper portion of housing 14 removed. FIG. 2 illustrates the path of heads 34 as they are actuated by stepper motor 32 across the surface of disk 10. As can be seen from FIG. 2 the heads move in an arc, illustrated by line 56, which can be described as a spiral path. This arc is due to the offset between the stepper motor shaft 14 and the theoretical center-line 46 of the disk 10. In FIG. 2, the inner most track is illustrated by semi-circle 000, while the outer extent of the tracks are illustrated by semi-circle 624. The position of the transducer is shown by dotted lines 34A and 40A at the end of arc 56 where the transducer is positioned over the outer track 624. Conversely, dotted lines 34B and 40B show the position of the transducer and arm at the other end of arc 56 wherein the transducer is positioned inwardly of track 000.

In the preferred embodiment of the present invention, the offset of the center line 44, of stepper motor shaft 36, from the center line 46 of disk 10, is selected so that arm 40 and head 34 need only travel through an arc of approximately 90° in order to be translated from outer track 624 to inner track 000. In the position of the arc shown by dotted lines 34B and 40B, the arm and transducer are rotated inwardly, beyond the track range. In the preferred embodiment of the present invention, as will be described in greater detail hereinafter, a ramp is provided and positioned in the path of arm 40 and transducer 34 so that, when they are moved into the position illustrated by 34B and 40B, the ramp physically displaces arm 40, and thus transducer 34 from the surface of the disk 10. This ramp is described in further detail herein in connection with FIG. 5.

Figure 3A:
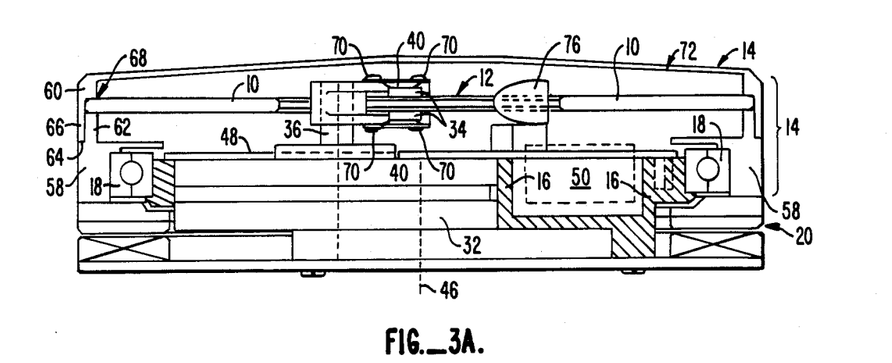
FIG. 3A is a side view of the present invention taken along lines 3A—3A of FIG. 2, but with a bottom-most circuit board conforming in shape to the housing.

Referring now to FIG. 3A, housing 14 preferably comprises a lower body portion 58 and a cover portion 60. Lower body portion 58 is preferably cylindrical in shape and has a lip 62 located towards the outer periphery, and a ledge 64 associated therewith. Cover 60 has a lip portion 66 along its outer periphery. The inner diameter of lip 66 and the outer diameter of lip 62 are selected so that the two lips nest with one another when cover 60 is placed over lower body 58, i.e. the outer diameter of lip 62 is selected to be greater than the inner diameter of lip 66. Further, the height of lip 66 is selected with respect to the height of lip 62 so that a groove 68 is formed for accommodating the outer periphery of disk 10. Adhesives, such as epoxy, can be applied in groove 68 to assist in fixedly securing disk 10 within groove 68. Disk 10 is further secured in groove 68 by the clamping action provided by cover 60 and loweer body 58.

Preferably, the adhesive used has a shrink rate so that the adhesive places the cover and lower body under tension when it cures. In turn, the periphery of disk 10 will be placed under compression. An effect equivalent to using an adhesive having a shrink rate can be achieved by initially providing physical compression to the cover 60, lower body 58 and disk 10 while the adhesive is curing. Once the adhesive has cured, the physical pressure can be removed. Alternate methods for securing cover 60 to lower body 58 include: threading, cam-locking, radial crimping, laser welding, ultrasonic welding, and the like. An advantage of using threaded or compression type securing techniques is that the media can be changed easily during the manufacturing process. This is a valuable feature whenever the manufacturing run is in its initial stages.

Figure 7A:
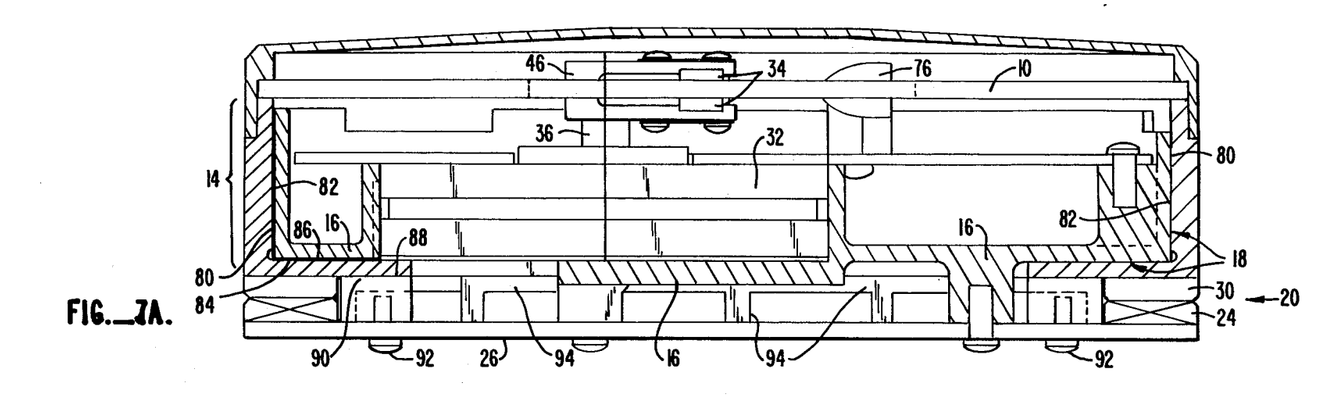
FIGS. 7A and 7B illustrates self actuated gas bearing structures for supporting the housing for rotation with respect to the base.
Figure 7B:
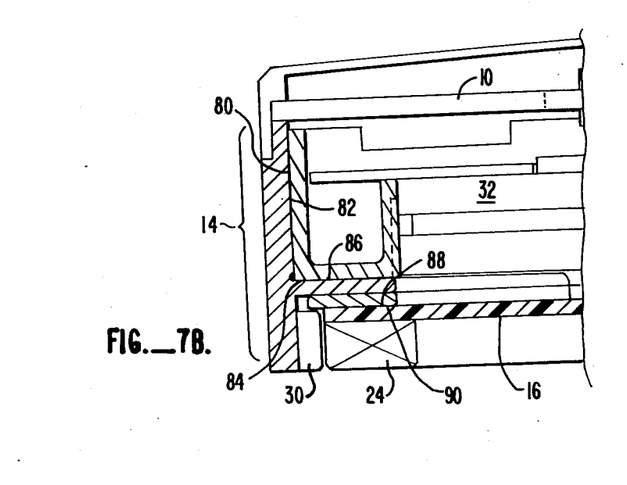

Referring to FIGS. 7A and 7B, in the preferred embodiment of the present invention, bearing means 18 are implemented by way of a self-activating gas bearing which is formed between juxtaposed surfaces of the outer periphery of housing 14 and complementary surface on base 16. Preferably, the air bearing has two components, (1) a radial component to provide support with respect radial forces on the housing 14; and (2) an axial component which supports the housing 14 in a direction parallel to the axis of rotation of the disk.

The radial component of the air bearing is formed by an interior surface 80 of housing 14, and a complementary surface 82 positioned on the base 16. This can be seen in FIG. 7A. Interior surface 80 is concave/circular in shape and is preferably lapped smooth. Complementary surface 82 is convex/circular in shape and is preferably textured to generate a radial air pressure component when the two surfaces are rotated with respect to one another. Preferably the spacing between surfaces 80 and 82 is approximately 0.5 mils.

In operation, the air bearing generated provides a force which tends to push surface 80 and 82 apart with a magnitude that is a function of the velocity with which the surfaces move with respect to one another. Because of the symmetrical and circular nature of surfaces 80 and 82, the air bearing forces tend to provide and equal separation between the surfaces about the entire circumference of the surfaces. Further, if one point of the housing begins to move closer to the base than another, the air bearing surfaces at that point will be present with a smaller volume in which to accommodate the moving air, and therefore generate a higher pressure. Conversely, the bearing surfaces at the point on the opposite side of the housing will be presented with a larger volume and thus generate a lower pressure. The radial component of the air bearing is thus self-centering. It is to be noted that the radial gas bearing surfaces have a length which corresponds to greater than one half of the height of housing 14. This is to control radial run-out. In the preferred embodiment of the present invention, where a single disk is used, this length of approximately ⅜ inches. For two disks, the length should be approximately ⅝ inches.

The axial component of the gas bearing if formed from two opposing gas bearing structures. The first such structure is constructed from a ring-shaped surface 84 positioned toward the outer periphery of housing 14 and a complementary ring-shaped surface 86 on base 16. Preferably, ring-shaped surface 84 is positioned perpendicular to surface 82 of the radial air bearing component. The second gas bearing structure provides a force in opposition to that provided by the first. Ring-shaped surface 88 is positioned on housing 14 and opposite surface 84. Complementary surface 90 is positioned on base 16 to be facing but spaced apart from complementary ring-shaped surface 86. In other words, the portion of housing 14 which support ring-shaped surface 84 and 88 is captured between the complementary surfaces 86 and 90 of base 16. Texturing is provide on at least one of the surfaces of each pair of surface of radial gas bearing component to create the air bearing.

Complementary surface 90 can be provided by way of a ring-shaped, surface bearing structure 94 which is fastened directly to circuit board 26 by way of screws 92 or the like. Preferably, the separation between complementary surface 86 and ring-shaped surface 84, and between complementary surface 90 and ring-shaped surface 88, is approximately 0.5 mils when the self activated gas bearings are operational.

When an air bearing is used, rotor 30 is secured to housing 14 to be approximately coplanar with ring-shaped surface 88. Stator 24 is secured to circuit board 26 in axial alignment with rotor 30.

FIG. 7B illustrates a different radial gap orientation of the motor which provides the rotational force to the housing. Motor 20 in FIG. 7A is in an axial gap configuration.

In another embodiment of the present invention, bearings 18 are preferably positioned with respect to lower body 58 and base 16 so that they provide radial support to the housing with respect to the center-line of disk 10. The bearings 18 are preferably positioned in a single plane which is substantially parallel to disk 10. Bearings 18 can be model KA030ARO manufactured by Kaydon of Michigan. It is to be noted that lower body 58, bearings 18, and base 16 form a continuous return path between the interior of housing 14 and the components of motor 20. This return path assists in shielding the interior of housing 14 from stray magnetic fields generated by DC brushless motor 20.

In the preferred embodiment of the present invention, DC brushless motor can be an axial-gap spin motor similar to that used in disk drive model 0A-D31V, 3½"MicroFloppy, manufactured by Sony Corporation of Japan.

Preferably, stepper motor 32 is a compact stepper motor, such as model 19RM-K001-01 manufactured by Minebea of Japan. The shaft 36 extends through center aperture 12 of disk 10. Bracket 38 is secured to shaft 36 by way of set screws, not shown. Arms 40 attach to bracket 38 by way of screws 70. Arms 40 are of the type conventionally provided with Winchester heads. Bracket 38 is preferably shaped so that transducer 34 has a skewed position relative to an imaginary line which passes through transducer 34 and center line 44 of stepper motor 32. From another point of view, bracket 32 permits transducer 34 and arm 40 to be positioned relative to orthogonal axes having their origin at center line 44 of stepper motor 32. Bracket 38 permits transducer 34 and arm 40 to be positioned parallel to one of the orthogonal axes and to be displaced a predetermined distance along the other orthogonal axis. In one embodiment of the present invention, the dimensions of bracket 38 are selected so that the skewing of the axis of transducer 34 relative to the tracks is a minimum at the center of the arc-shaped path described by the transducer 34 as it is moved from one extreme of the field of tracks to the other. In terms of the imaginary line which passes through transducer 34 and center line 44 of stepper motor 32, such imaginary line, when displaced from the other orthogonal axis by an angle of approximately 18°, will provide a minimum of skew at the center of the arc-shaped path.

In the preferred embodiment of the present invention, transducer 34 and arm 40 can be a simple modification of commercially available Winchester heads, such as model no. 3377-100 manufactured by National Magnetics, Inc. of San Diego, CA. Such a head should be modified so that the existing slider is rotated 180°. This modification is needed to obtain proper orientation of the typical leading-edge ramp on the head with respect to the direction of motion of the disk. As is well known in the art, such a ramp provides lift to the head, when the disk first starts rotating, to start the head "flying". With the typical outside-access head, the ramp is oriented to the left side of the head when looking from the outside and toward the inside of the disk. For an inside-access head, the ramp should face to the right side of the head when looking from the inside and toward the outside.

With a head and arm, such as the modified National Magnetics, Inc. model, and assuming a disk diameter of approximately 3.8 inches, the amount of offset provided by bracket 38 should be approximately 0.3 inches. The above offset operates as a skew correction for the positioning of the heads for the various tracks between tracks 000 an 624 on disk 10. In previous disk drives the maximum amount of skew of the head with respect to the tracks over the range of tracks can be expected to be in the six to twelve degree range. In the example of the present invention provided above, and assuming an offset of the center line of the shaft of the stepper motor versus the center line of disk 10 of approximately 0.45 inches, a typical skew of approximately three degrees can be obtained. The above offset, when within the range of 0.40" to 0.60", can provide satisfactory skew values.

It is to be understood that disk 10 of the present invention can be any one of a number of recording media, including rigid disks, floppy disks, foils, capacitive disks, optical disks, and the like. It is to be understood that the transducer means 34 will be selected in accordance with the type of recording media used for disk 10.

It is also to be understood that recording surfaces can be provided on the interior surfaces 72 of housing 14. In order to read or write data with respect to these surfaces, arm 40 can be rotated an additional amount along arc 56 so that transducer means 34 will be placed adjacent to interior wall 72 for a particular rotational arc position of stepper motor shaft 36. This can be accomplished while still permitting transducer 34 to access the various tracks on the surface of disk 10. This can oe seen from FIG. 2. More specifically, transducer 34 and arm 40 will be rotated past the position indicated by dotted lines 34A and 40A. It can be seen thar arc 56 extends to a point where transducer 34 is brought into close proximity with the interior wall of housing 14.

Figure 4:
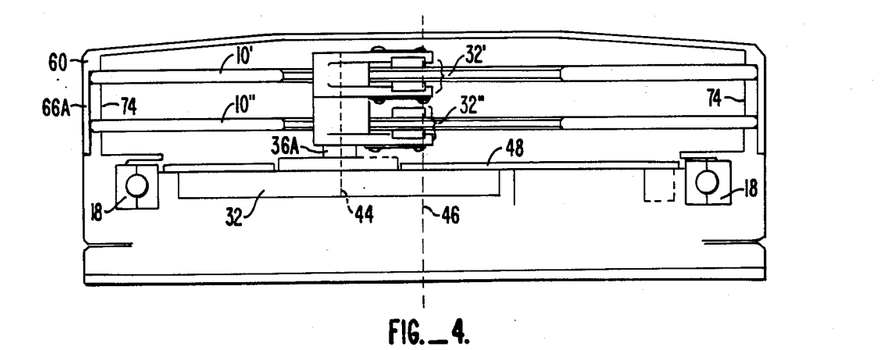
FIG. 4 is a side view of the present invention taken along lines 3A—3A of the FIG. 2 for the embodiment of the invention having a plurality of disks.

Referring now to FIG. 4, an alternative, multidisk embodiment of the present invention is shown. As can be seen from the Figure, it is a simple matter to increase the number of disks within the disk drive. An extended lip 66A on cover portion 60 is provided. A spacer ring 74 is positioned between disk 10' and disk 10". An extended bracket 38A is provided to support heads 32' and 32". Bracket 38A is supported on and rotated by extended stepper motor shaft 36A. All other components of the disk drive device remain substantially the same.

Referring now to FIGS. 2, 3A, 3B, and 5, a ramp 76 is shown which acts to unload the heads from the disk when the heads 34 and arm 40 are rotated inwardly beyond the position of lines 34B and 40B, to a park position illustrated by lines 34C and 40C. The ramp is formed with 1.2" radius, with respect to the center line of the stepper motor 32, and is provided with upper and lower surfaces each having a slope of preferably 2° away from the plane of the disk 10. In this manner, a separation distance between the heads and the disk can be obtained of approximately 0.03 inches for a rotation displacement of 45 degrees of arm 40.

Ramp 76 preferably has surfaces which will make contact with arm 40 when the arm 40 is in the park position with reverse angularity. As can be seen from FIG. 5, a forward section 76A provides a rising surface towards the interior of ramp 76, while rear section 76B provides a surface which slopes away from the interior of the ramp. This reverse angularity ensures that when the head is in the park position, it will not be unloaded from the ramp 76 by the vibrarions present in the disk drive. The slope utilized is a balancing of the power available from the stepper motor 32 for moving the arm 40 off of the ramp 76, versus the ideal slope required to offset translation of the head due to the vibration present in the system.

Figure 5:
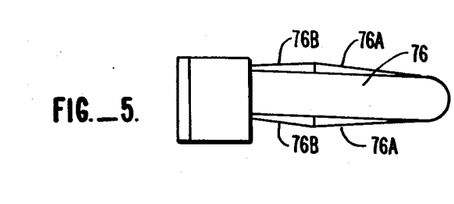
FIG. 5 is a simplified drawing of an end-on view of means for de-coupling the transducer means from the disk's surface.

Ramp 76 is further preferably oriented on the same radius as that of the stepper motor shaft 36; i.e. not the radius of the disk 10. Otherwise, the heads 34 will tend to move radially in toward the ramp 76 as they are translated along the arc of the ramp.

Preferably, the design of the ramp 76 includes aerodynamic streamlining to minimize the effect of the ramp on the air bearing which supports the heads 34 over the disk 10. Preferably, the ramp 76 is constructed from self-lubricating plastic, such as Turcite, manufactured by General Electric Company.

Figure 6:
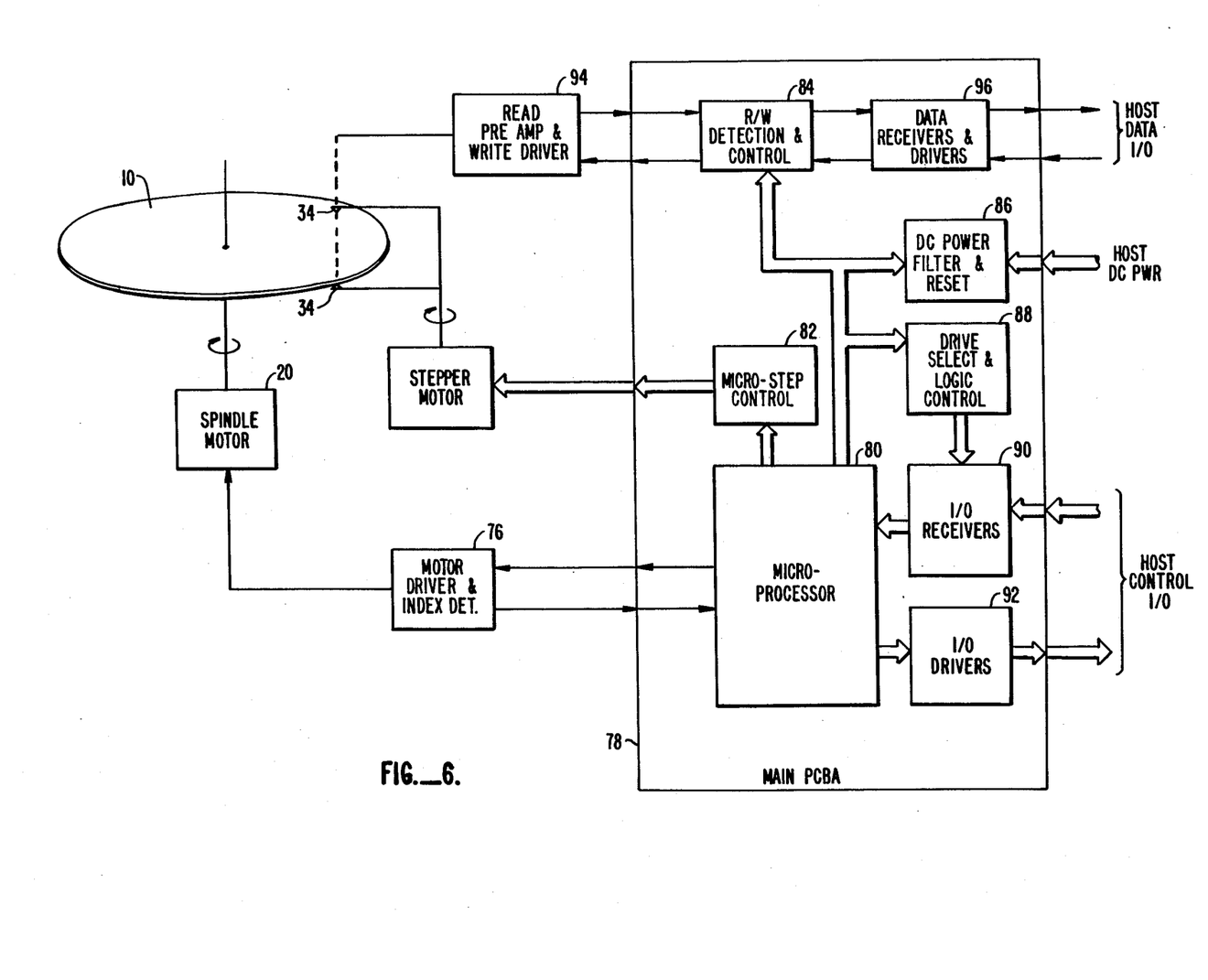
FIG. 6 is a simplified functional block diagram of the electro magnetic elements of the present invention.

Referring now to FIG. 6, a functional block diagram of the electrical-circuitry associated with the disk drive of the present invention is shown. Disk 10 is rotated by spindle motor 20, such as the brushless DC motor described above. Spindle motor 20 is powered by motor driver circuitry 76. Motor driver circuitry can be positioned on circuit board 26, FIG. 1. One suitable motor driver circuit is device number HA 13426 manufactured by HITACHI of Japan. Examples of suitable control and interface circuitry include the interface circuitry detailed in the Users Manual for Rodime 350 Series, USM 0040, 3.5" Winchester disk drive, 1983, FIGS. 10–11C, pages 41–44, available from Rodime PLC, Mission Viejo, CA.

Control and interface circuitry 78 is conventional and includes a microprocessor 80 which supplies drive signals to motor driver circuit 76, instructions to microstep control circuit 82, control signals to read/write detection and control circuit 84, control signals to DC power filter and reset circuit 86, control signals to drive select and logic control circuit 88, and which receives I/O from I/O receivers 90, and which provides I/O to I/O drivers 92.

The I/O drivers and receivers 90 and 92 provide control I/O to and receive control I/O from the user, such as a host controller. Drive select circuit 88 responds to instructions from microprocessor 80 to select multiple disk drive addresses. Micro-step control circuitry 82 responds to instructions supplied from microprocessor 80 to provide appropriate drive signals to stepper motor 32 so as to cause shaft 36 to rotate by the desired amount, and hence to position heads 34 to the addressed position on disk 10.

Read/write detection and control circuitry decode the signals received from heads 34, via read/write preamp and driver circuitry, and provide the decoded data to the host, via data receiver and driver circuitry 96. Similarly, data received from the host are provided by data receiver and driver circuit 96 to read/write detection and control circuit 84. There the data is placed into the proper format or writing onto the disk 10 and supplied to write driver circuit 94.

Figure 3B:
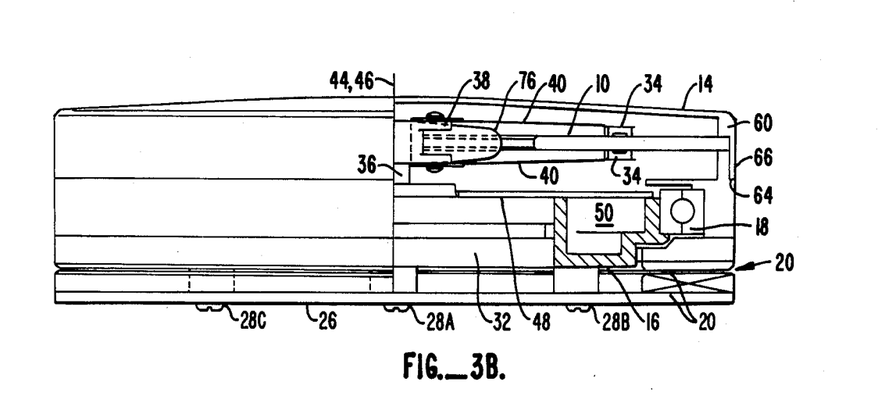
FIG. 3B is a side view of the present invention taken along line 3B—3B of FIG. 2, but with a bottommost most circuit board conforming in shape to the housing.

Read preamp and write driver circuit 94 can be located on circuit board 48 and compartment 50, FIG. 1. Similarly, control and interface circuitry 78 can be positioned on circuit board 26, FIGS. 1 and 3A,B.

Finally, circuit board 26 can also be shaped as a mother board 52 and to include edge-type connectors 98, FIG. 2, suitable for coupling to mother board connectors such as those found in computers, such as personal computers and microcomputers. With the low profile provided by the present invention, the disk drive of the present invention can be used much like any other plug-in peripheral card.

The terms and expressions which nave been employed here are used as terms of description and not of limitations, and there is no intention, in the use of such terms and expressions of excluding equivalents of the features shown and described, or portions thereof, it being recognized that various modifications are possible within the scope of the invention claimed.

What is claimed is:

1. An improved magnetic disk recording apparatus of the type including a disk having at least one recording surface and an aperture centered with respect to the center line of the disk, transducer means for sensing the recording surface, a housing, and a base wherein the disk is secured about its periphery to the periphery of the housing, the improvement comprising:

bearing means for supporting the housing for rotation, wherein the bearing means are positioned on the base so as to make contact with the housing at the periphery of the housing;

means for urging the housing to rotate relative to the base; and means coupled to the transducer means through the aperture and supported on the base inwardly from the bearing means for moving the transducer means relative to the surface of the disk.

2. The improved apparatus of claim 1, wherein said bearing means are positioned in a single row ball bearing assembly.

3. The improved apparatus of claim 1 wherein the urging means apply rotational force to the housing at the outer periphery thereof.

4. The improved apparatus of claim 3 wherein the urging means comprise a motor which includes a rotor affixed to the periphery of the housing and a stator affixed to the base and aligned with the rotor.

5. The improved apparatus of claim 4, in which the bearing means include a ball bearing assembly and wherein a rotational repulsive force is generated between the rotor and stator when the motor is energized to cause rotation of the rotor with respect to the stator, and further, wherein the bearing means are positioned with respect to the motor so that the bearing means are preloaded by the axial attractive force of the magnetic fields in the motor.

6. The improved apparatus of claim 4, in which the bearing means include a ball bearing assembly and wherein the bearing means are positioned between the motor and the disk so that the housing, bearing means and base provide an electromagnetic shield between the motor and the disk at the periphery of the apparatus.

7. The improved apparatus of claim 1 wherein the moving means include:

a stepper motor having a shaft whrein said shaft is radially displaced from the center line of the disk; and means for directly coupling the transducer means to the shaft of the stepper motor for rotation therewith so that rotation of the stepper motor causes the transducer means to be moved in an arc relative to the disk surface.

8. The improved apparatus of claim 7 wherein the amount of displacement between the system motor shaft and the center line of the disk is within the range of 0.40" to 0.60".

9. The improved apparatus of claim 7 wherein the disk includes a plurality of concentric tracks, the transducer means has an axis, and the coupling means include a bracket for coupling the transducer means to the stepper motor shaft, and further wherein the bracket is shaped to displace the transducer means from the stepper motor shaft so that the axis of the transducer means has a position relative to first and second orthogonal axes which are also orthogonal to the longitudinal axis of the stepper motor shaft and which have origins coincident at the center line of the stepper motor shaft, wherein in said position the axis of the transducer means is parallel to the first orthogonal axis and displaced a predetermined distance along the second orthogonal axis, wherein the predetermined distance is selected to minimize skewing of the axis of the transducer means relative to the concentric tracks of the disk as the transducer means is moved relative to the disk.

10. The improved apparatus of claim 9 wherein transducer can be positioned across the disk in an arc-shaped path and further wherein the bracket is dimensioned so that an imaginary line which intersects the transducer means and the stepper motor shaft is angularly displaced from the second orthogonal axis approximately by a predetermined quantity which is selected so that the skewing of the axis of the transducer means relative to the concentric tracks is at a minimum at the center of the arc-shaped path.

11. The improved apparatus of claim 10 wherein the angular displacement between the imaginary line and the second orthogonal axis is approximately 18 degrees.

12. The improved apparatus of claim 9 wherein the stepper motor shaft is radially displaced from the center line of the disk so that the transducer means has a path of motion such that rotation of the stepper motor shaft over an arc less than a predetermined angle causes the transducer means to be moved relative to the disk surface over all of the plurality of concentric tracks, further including means positioned on the base and towards one end of the path of motion of the transducer means for disengaging the transducer means from the disk when the stepper motor shaft is rotated beyond the predetermined angle.

13. The improved apparatus of claim 1 wherein the housing comprises an upper cover having a lip portion of a predetermined inner diameter and a lower body having a lip portion of predetermined outer diameter greater than the inner diameter of the upper cover lip and so that the upper cover nests with the lower body, and further wherein the disk periphery is compressed axially between the upper cover and lower body when said upper cover is nested with said lower body.

14. The improved apparatus of claim 13 wherein the upper cover and the lower body can be disassembled from one another to permit changing of the recording media.

15. The apparatus of claim 1 wherein the base further includes board means for supporting electronic circuitry, wherein said electronic circuitry interfaces the transducer means to a user and provides power to the apparatus, said board means further including connector means shaped to couple directly to a mother board of a computer or to an edge connector.

16. The improved apparatus of claim 1 wherein the interior surfaces of the housing comprise a recording medium and further wherein the transducer means are translated to be adjacent the interior surface of the housing.

17. The improved apparatus of claim 1 wherein the periphery of the disk is clamped by the housing.

18. The improved apparatus of claim 1 or 3 wherein the bearing means comprise self activated gas bearings.

19. The improved apparatus of claim 18 wherein the housing rotates about an axis of rotation and said self activated gas bearings include
a first surface positioned about an inside periphery of the housing and to be substantially parallel to the axis of rotation of the housing;
a second surface positioned on the base and shaped to be complimentary to the first surface, said first and second surfaces being juxtaposed one another wherein at least one surface has a texture which generates an air bearing when the first and second surfaces are set into motion relative to one another;
first and second opposing surfaces positioned on the base and substantially parallel to the disk; and
third and fourth opposing surfaces positioned on the housing and between the first and second opposing surfaces, wherein the third and fourth opposing surfaces are shaped to be complimentary to the first and second opposing surfaces respectively, and further wherein at least one of said opposing surfaces have a texture which generates an air bearing when said first and second opposing surfaces are set into motion relative to the third and fourth opposing surfaces.

20. The apparatus of claim 18 wherein said self activated gas bearings include
an axially oriented self activated gas bearing positioned on an outer periphery of the housing for supplying radial support of the housing relative to the base; and
a radially oriented self activated gas bearing positioned on the outer periphery of the housing to provide axial support the housing relative to the base.

21. The apparatus of claim 20 wherein said radially oriented self activated gas bearing includes
a first gas bearing which provides a supporting force to the housing in a first axial direction; and
a second gas bearing which provides a supporting force to the housing in a direction opposite to the first axial direction.

22. The improved apparatus of claim 1 or 3 wherein the disk is a rigid disk.

23. The improved apparatus of claim 1 or 3 wherein the disk is an optical disk.

24. The improved apparatus of claim 1 or 3 wherein the disk is an capacitive disk.

25. The improved apparatus of claim 1 or 3 wherein the disk is a floppy disk.

* * * * *